(12) United States Patent
Suefuji (10) Patent No.: US 8,783,691 B2
(45) Date of Patent: Jul. 22, 2014

(54) MECHANICAL SEAL DEVICE

(75) Inventor: Yoshihiro Suefuji, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 255 days.

(21) Appl. No.: 13/257,109

(22) PCT Filed: Aug. 30, 2010

(86) PCT No.: PCT/JP2010/064736
§ 371 (c)(1),
(2), (4) Date: Sep. 16, 2011

(87) PCT Pub. No.: WO2011/040163
PCT Pub. Date: Apr. 7, 2011

(65) Prior Publication Data
US 2012/0187636 A1    Jul. 26, 2012

(30) Foreign Application Priority Data

Oct. 2, 2009    (JP) .................... 2009-230621

(51) Int. Cl.
*F16J 15/34* (2006.01)
*F16J 15/38* (2006.01)
*F16J 15/16* (2006.01)

(52) U.S. Cl.
CPC .............. *F16J 15/3448* (2013.01); *F16J 15/38* (2013.01); *F16J 15/34* (2013.01); *F16J 15/16* (2013.01); *F16J 15/3404* (2013.01); *F16J 15/3436* (2013.01); *F16J 15/3464* (2013.01)
USPC ............ 277/388; 277/387; 277/390; 277/408

(58) Field of Classification Search
CPC ......... F16J 15/38; F16J 15/3404; F16J 15/40; F16J 15/3448

USPC .................................. 277/387, 388, 390, 408
See application file for complete search history.

(56) References Cited

U.S. PATENT DOCUMENTS

| | | | | |
|---|---|---|---|---|
| 3,179,422 A | * | 4/1965 | Phillips ......................... | 277/361 |
| 5,333,882 A | * | 8/1994 | Azibert et al. ................ | 277/367 |
| 5,468,002 A | * | 11/1995 | Wasser ......................... | 277/361 |
| 5,938,205 A | * | 8/1999 | Azibert et al. ................ | 277/361 |
| 6,325,382 B1 | * | 12/2001 | Iwamoto et al. .............. | 277/368 |

FOREIGN PATENT DOCUMENTS

| | | |
|---|---|---|
| JP | H11-287330 | 10/1999 |
| JP | 2001-012614 | 1/2001 |
| JP | 2007-211939 | 8/2007 |

* cited by examiner

*Primary Examiner* — Vishal Patel
*Assistant Examiner* — Nicholas L Foster
(74) *Attorney, Agent, or Firm* — Harness, Dickey & Pierce, PLC (57) ABSTRACT

A mechanical seal device is provided for use when fluid pressure is frequently switched between positive and counter pressures. A rotary ring is provided on a rotary shaft and a stationary ring assembly is provided on which the stationary ring side sliding face is formed. A seal cover is provided containing the stationary ring assembly on an inner diameter side and supports the freely moving assembly in an axial direction of the rotary shaft along with a first O-ring to seal the first fluid and a second O-ring to seal the second fluid. A low-pressure chamber is sealed from the first fluid and the second fluid and maintains pressure lower than those of the first and the second fluids.

8 Claims, 4 Drawing Sheets

MECHANICAL SEAL DEVICE

BACKGROUND OF THE INVENTION

1. Field of the Invention

The present invention relates to a mechanical seal device which is preferably used for a shaft seal of centrifugal pump, agitator, etc.

2. Description of the Related Art

There exists a mechanical seal device which seals a high viscosity fluid and the like under a condition that fluid pressure within the apparatus is frequently changed in operation. As for a mechanical seal device used under such condition, for instance, a double mechanical seal device, wherein one O-ring for a secondary seal is sandwiched with a step formed stationary ring and a step formed housing, is known (See Japanese Unexamined Patent Application No. 2003-97728 and the like).

Mechanical seal device of conventional art, comprising the secondary seal O-ring sandwiched between step part of stationary ring and step part of housing, is capable of sealing fluid within the apparatus even when pressure of fluid within the apparatus varies. Namely, mechanical seal device having such structure is capable of pressing stationary ring toward rotary ring even under a positive pressure in which pressure of fluid within the apparatus is higher than that of fluid outside the apparatus, or even under a counter pressure in which pressure of fluid within the apparatus is lower than that of fluid outside the apparatus.

However, with the mechanical seal device comprising O-ring sandwiched between step part of stationary ring and that of housing, when fluid pressure changes between positive pressure and counter pressure, O-ring moves in a room surrounded by step part of stationary ring and that of housing. Namely, O-ring moves toward outside of the apparatus when fluid pressure is positive pressure, while O-ring moves toward inside of the apparatus when fluid pressure is counter pressure.

Accordingly, a problem occur with the mechanical seal device of conventional art that O-ring itself and stationary ring or step part of housing which contact with O-ring are worn by the movement of O-ring, and reduces life expectancy of the mechanical seal device. Particularly when used under a condition that fluid pressure frequently switches between positive pressure and counter pressure, O-ring and parts contacting O-ring are rapidly worn; and that problems such as leakage and reduced life expectancy are likely to occur.

BRIEF SUMMARY OF THE INVENTION

The present invention is introduced to resolve the above mentioned problems, and its object is to provide a mechanical seal device which is suitably used even under a condition that fluid pressure is frequently switched between a positive pressure and a counter pressure.

In order to resolve the problems mentioned hereinbefore, mechanical seal device of the present invention comprises;

a rotary ring provided on a rotary shaft so as to integrally rotate with the rotary shaft, and on which rotary ring side sliding face that constitutes one face of dynamic seal surface, which dynamically seals between a first fluid within the apparatus and a second fluid provided closer to outside the apparatus than the first fluid, is formed, a stationary ring assembly on which stationary ring side sliding face that slides with the rotary ring side sliding face and constitutes the other surface of the dynamic seal surface is formed, a seal cover which contains the stationary ring assembly on inner diameter side and supports the stationary ring assembly to move freely in an axial direction of the rotary shaft, a first O-ring which is sandwiched by the seal cover and the stationary ring assembly in a radial direction of the rotary shaft to seal the first fluid, and a second O-ring which is provided closer to outside of the apparatus than the first O-ring and which is sandwiched by the seal cover and the stationary ring assembly in the radial direction, to seal the second fluid wherein;

a low-pressure chamber, which is sealed from the first fluid and the second fluid by the first O-ring and the second O-ring and which maintains continual pressure lower than the pressure of the first fluid and that of the second fluid, is formed between the first O-ring and the second O-ring, a first pressure acting diameter, formed by a boundary of pressure acting region, in which the first fluid presses the stationary ring assembly except the stationary ring side sliding face, and pressure not acting region, in which the first fluid do not press the stationary ring assembly, is located, when viewed in the radial direction, on a second seal end side which is an end of the dynamic seal surface at the second fluid side with respect to a first seal end which is an end of the dynamic seal surface at the first fluid side, and a second pressure acting diameter, formed by a boundary of pressure acting region, in which the second fluid presses the stationary ring assembly except the stationary ring side sliding face, and pressure not acting region, in which the second fluid do not press the stationary ring assembly, is located, when viewed in the radial direction, on the first seal end side with respect to the second seal end.

In mechanical seal device of the present invention, stationary ring assembly is disposed on seal cover via two O-rings, comprising the first O-ring and the second O-ring and low-pressure chamber is formed between the two O-rings. Since pressure in the low-pressure chamber is maintained lower than the pressure of the first fluid and that of the second fluid, the two O-rings receive pressing force toward the low-pressure chamber, even when fluid pressure is a positive pressure or a counter pressure. Accordingly, mechanical seal device of the invention is capable of preventing movement of O-ring, a secondary seal of fluid, when fluid pressure switches between positive pressure and counter pressure. Therefore, mechanical seal device of the present invention is capable of preventing wear phenomenon of O-ring itself and parts contacting O-ring, which leads to high-durability. Note that seal cover may be provided with a communication pass penetrating to the low-pressure chamber and the communication pass has an opening on outer periphery of the seal cover.

In mechanical seal device of the present invention, the first pressure acting diameter is located, when viewed in a radial direction, on the second seal end side with respect to the first seal end, while the second pressure acting diameter is located on the first seal end side with respect to the second seal end. This allows in mechanical seal device of the present invention to press stationary ring assembly toward rotary ring even when fluid pressure is a positive pressure or a counter pressure.

Further, the seal cover comprises an engaging projection on cover side, which locks the first O-ring in the axial direction and regulates movement of the first O-ring in the axial direction and the stationary ring assembly comprises an engaging projection on stationary ring side which locks the second O-ring in the axial direction and regulates movement of the second O-ring in the axial direction, wherein the first pressure acting diameter corresponds to an inner periphery of a first fluid secondary seal, formed by a contact face in the radial direction between the first O-ring and the stationary ring assembly, and diameter of inner periphery of the first fluid secondary seal may be smaller than that of the first seal end, and the second pressure acting diameter corresponds to an outer periphery of a second fluid secondary seal, formed by a contact face in the radial direction between the second O-ring and the seal cover, and diameter of outer periphery of the second fluid secondary seal may be larger than that of the second seal end.

By locking the first O-ring with engaging projection on cover side and the second O-ring with engaging projection on stationary ring side, forms of the first O-ring and that of the second O-ring in mechanical seal device of the present invention can be approximately the same. Therefore, with the mechanical seal device having such structure, types of component parts can be decreased making its assembly easy. Further, by locking the first O-ring with the seal cover and locking the second O-ring with stationary ring assembly, forms of low-pressure chamber and the seal cover can be simplified.

The stationary ring assembly comprises a stationary ring slide part, on which the stationary ring side sliding face is formed, and contacts with the first O-ring, and an adapter part which at least partially disposed closer to outside of the apparatus than the stationary ring slide part, and contacts with the second O-ring, wherein the stationary ring slide part and the adapter part are formed separately and a slide part end face at outer side of the apparatus, which is an end face of the stationary ring slide part closer to outside of the apparatus, may contact with the adapter part. By making stationary ring slide part and adapter part separate, assembly of the mechanical seal device can be easy and form of seal cover can be simplified.

The engaging projection on cover side may double as a stopper, which prevents the adapter part to fall out in the axial direction. Therefore, mechanical seal device of such structure is able to prevent adapter part to fall out when assemble and disassemble, which makes the assemble and disassemble easy.

Stationary ring slide part comprises a slide ring on which the stationary ring side sliding face is formed and a retainer which contacts with the first O-ring, wherein the slide ring and the retainer are separately formed and the slide ring may be fixed to the retainer. By making the slide ring and the retainer separate, the slide ring on which stationary ring side sliding face is formed can be miniaturized and that crack initiation on slide ring can be prevented. Note that the slide ring may be fixed to the retainer by thermal insert or may be fixed to the retainer via the third O-ring.

DETAILED DESCRIPTION OF THE INVENTION

Figure 1:
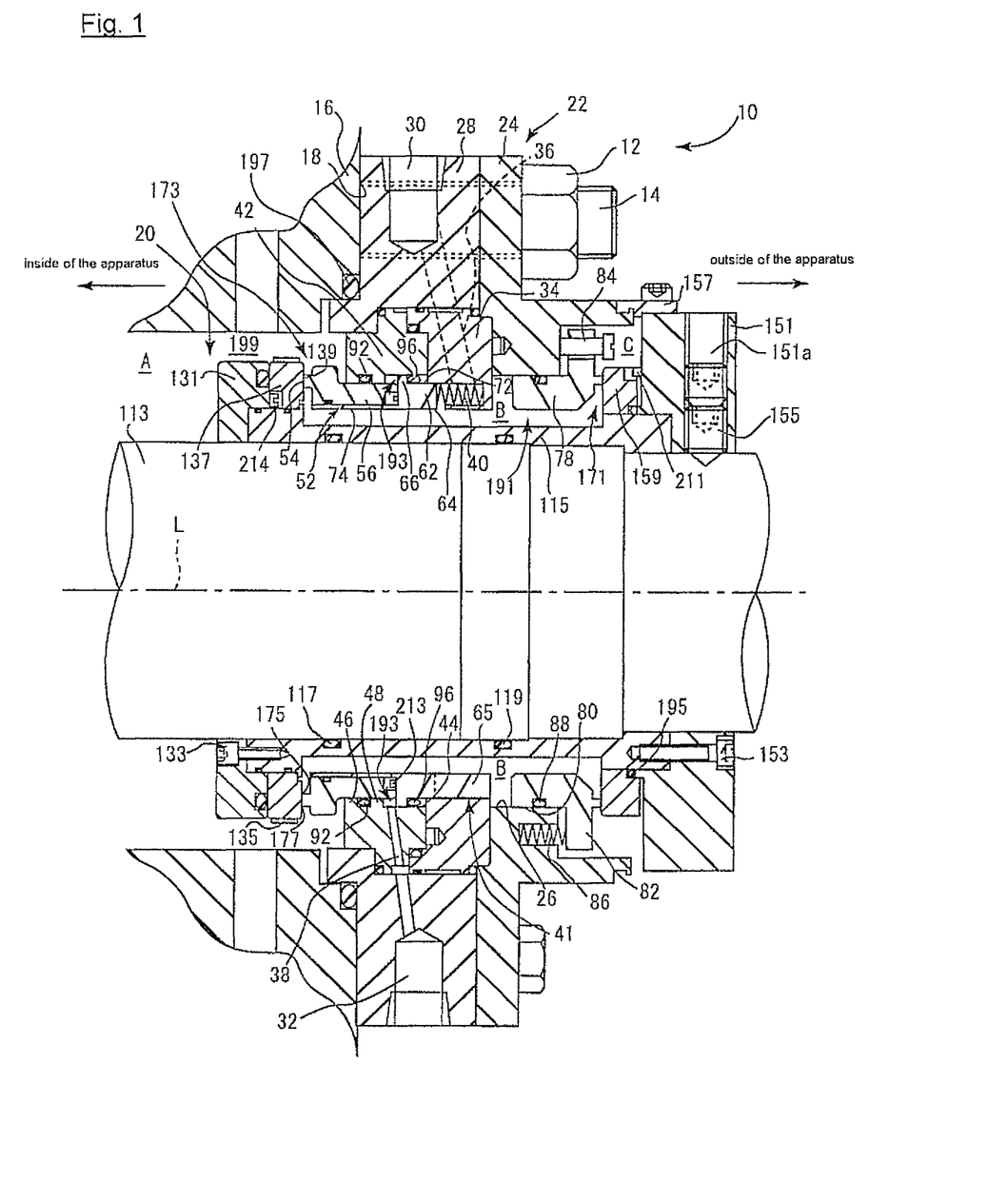
FIG. 1 is a longitudinal cross sectional view of a mechanical seal device as a first embodiment of the present invention.

FIG. 1 is a longitudinal cross sectional view of a mechanical seal device as a first embodiment of the present invention.

Mechanical seal device 10 of the present embodiment may be used as a shaft seal device such as pump, agitator and rotary joint. In particular, mechanical seal device 10 may suitably be used as shaft seal device of a pump, such as gear pump and screw pump, which convey high viscosity fluid; however, the use of mechanical seal device 10 is not limited to this.

FIG. 1 shows mechanical seal 10 of the present embodiment wherein seal 10 is disposed to housing 16 of the device in which rotary shaft 113 penetrates. As is shown in FIG. 1, shaft bore 20 is formed in housing 16, in which rotary shaft 113 penetrates. Mechanical seal device 10 is set on housing 16 and rotary shaft 113 in order to seal the gap between rotary shaft 113, which penetrates shaft bore 20, and housing 16.

Mechanical seal device 10 may internally form two dynamic seal surfaces comprising dynamic seal surface within the apparatus 173 and dynamic seal surface outside the apparatus 171. Namely, mechanical seal device 10 is a double mechanical seal wherein two dynamic seal surfaces, forming dynamic seal surface within the apparatus 173 and dynamic seal surface outside the apparatus 171, are arranged along rotary shaft 113.

Dynamic seal surface within the apparatus 173 seals between transfer fluid A, present in chamber within the apparatus 199 which is closer to inside of the apparatus (left side of FIG. 1) than dynamic seal surface within the apparatus 173, and supplying fluid B, present in fluid supplying chamber 191 which is closer to outside of the apparatus (right side of FIG. 1) than dynamic seal surface within the apparatus 173. Further, dynamic seal surface outside the apparatus 171 seals between supplying fluid B, present in fluid supplying chamber 191 which is closer to inside of the apparatus than dynamic seal surface outside the apparatus 171, and the third fluid C (outside air) which is closer to outside of the apparatus than dynamic seal surface outside the apparatus 171

Mechanical seal device 10 comprises rotary ring within the apparatus 137, rotary ring outside the apparatus 159, stationary ring assembly within the apparatus 52, stationary ring outside the apparatus 78, seal cover 22, the first O-ring 92 and the second O-ring 96. Mechanical seal device 10 further comprises sleeve 115, sleeve collar within the apparatus 131, sleeve collar outside the apparatus 151, set screw 155, O-ring 88, etc.

First, stationary part of mechanical seal device 10, which is disposed on housing 16 and the like and does not rotate with rotary shaft 113, will be described. Seal cover 22 comprises the first cover member 24, the second cover member 28, the third cover member 34 and the fourth cover member 42. The first cover member 24, the second cover member 28, the third cover member 34 and the fourth cover member 42 are mutually connected under a condition wherein relative movements are prevented by rotary stopper mechanism and gaps between each member are sealed by O-ring.

Seal cover 22 comprising the first to the fourth cover members 24, 28, 34 and 42 is set to outer surface 18, an end face of housing 16 closer to outside of the apparatus, via O-ring 197. Seal cover 22 is fixed to housing 16 by fastening bolt 14 to bolt hole (not shown) formed on outer surface 18 of housing 16. As is shown in FIG. 1, bolt 14 let seal cover 22 fixed to housing 16 via nut 12.

The first cover member 24 constitutes a part of seal cover 22 closer to outside the apparatus. Stationary ring outside the apparatus 78 is disposed to inner periphery 26 of the first cover, which is an inner periphery of the first cover member 24. Stationary ring outside the apparatus 78 is disposed by holding O-ring 88 in a radial direction between outer periphery of stationary ring outside the apparatus 80, which is outer periphery of stationary ring outside the apparatus 78, and inner periphery of the first cover 26.

Note that "an axial direction" in the present embodiment means an axial direction of rotary shaft 113 which is parallel to central shaft L of rotary shaft 113. Further, "a radial direction" means a radial direction of rotary shaft 113 which is a direction from central shaft L of rotary shaft 113 to outer periphery of rotary shaft 113.

Stationary ring outside the apparatus 78 comprises arm part 82 which is projecting toward outer diameter side. Stationary ring outside the apparatus 78 is locked by rotary stopper pin 84, which is engaged to both arm part 82 and the first cover member 24, in order not to rotate on seal cover 22. Further, spring outside the apparatus 86 is disposed between arm part 82 and the first cover member 24. Stationary ring outside the apparatus 78 is biased toward rotary ring outside the apparatus 159, disposed closer to outside of the apparatus than stationary ring outside the apparatus 78, by spring outside the apparatus 86. One surface is formed on the outer end face of stationary ring outside the apparatus 78, which slides with the other surface on dynamic seal surface outside the apparatus 171. One surface is formed on the end face of stationary ring outside the apparatus 78 at outside of the apparatus, which slides with the other surface on dynamic seal surface outside the apparatus 171.

The second cover member 28 constitutes outer diameter side part of seal cover 22 at inside part of the apparatus. The second cover member 28 is disposed between the first cover member 24 and housing 16. Further, the third cover member 34 and the fourth cover member 42 are disposed at inner diameter side of the second cover member 28.

Supply-introduction flow pass 30, an inlet of supplying fluid B to inner part of mechanical seal device 10, is formed in the second cover member 28. Opening of supply-introduction flow pass 30 is formed on outer periphery of the second cover member 28, and outer tube (not shown) is connected to the opening of supply-introduction flow pass 30 for introducing supplying fluid B.

Supply-introduction flow pass 30 communicates with supply-communication flow pass 36 formed in the third cover member 34 and that supplying fluid B is introduced to fluid supplying chamber 191 by passing through supply-introduction flow pass 30 and supply-communication flow pass 36. Supplying fluid B is not particularly limited; however, it may be water and the like. Supplying pressure of supplying fluid B supplied to fluid supplying chamber 191 is not particularly limited; however, it may be higher than that of transfer fluid A by 0.2 MPA or so.

Note that flow pass to eject supplying fluid B is also formed in the second cover member 28 and the third cover member 34. Flow pass to eject supplying fluid B and flow pass to supply supplying fluid B are formed at different position with respect to a circumferential direction. However, flow pass to eject supplying fluid B is the same in form with the supplying flow pass, which comprises supply-introduction flow pass 30 and supply-communication flow pass 36, and that its details will be abbreviated.

Low-pressure introduction flow pass 32, which introduces low-pressure fluid D (See FIG. 2) into low-pressure chamber 193 formed inside of mechanical seal device 10, is formed in the second cover member 28. Low-pressure introduction flow pass 32 communicates with low-pressure communication flow pass 38 formed in the fourth cover member 42 and that low-pressure fluid D is introduced to low-pressure chamber 193 by passing through low-pressure introduction flow pass 32 and low-pressure communication flow pass 38. Low-pressure fluid D introduced to low-pressure chamber 193 is not particularly limited; however, outside air (atmosphere) is used in mechanical seal device 10 according to the present embodiment. Accordingly, opening of low-pressure introduction flow pass 32 is formed on outer periphery of the second cover member 28, and that outside air is introduced to inner part of low-pressure introduction flow pass 32 via said opening of low-pressure introduction flow pass 32.

The third cover member 34 partly constitutes inner diameter side part of seal cover 22 at inside part of the apparatus. The third cover member 34 is disposed closer to inside of the apparatus than the first cover member 24 and also at inner diameter side of the second cover member 28. Further, the fourth cover member 42 is disposed closer to inside of the apparatus than the third cover member 34.

Supply-communication flow pass 36 is formed in the third cover member 34, in order to introduce supplying fluid B into fluid supplying chamber 191. An opening of supply-communication flow pass 36 is connected to supply-introduction flow pass 30 formed in the second cover member 28; and the other opening of supply-communication flow pass 36 is connected to fluid supplying chamber 191.

The fourth cover member 42 partly constitutes inner diameter side part of seal cover 22 at inside part of the apparatus. The fourth cover member 42 is disposed at inner diameter side of the second cover member 28 and also closer to inside of the apparatus than the third cover member 34.

Low-pressure communication flow pass 38 is formed in the fourth cover member 42, in order to introduce low-pressure fluid D into low-pressure chamber 193. An opening of low-pressure communication flow pass 38 is connected to low-pressure introduction flow pass 32 formed in the second cover member 28; and the other opening of low-pressure communication flow pass 38 is connected to low-pressure chamber 193.

Stationary ring assembly within the apparatus 52 is provided at inner diameter side of the third cover member 34 and the fourth cover member 42. Stationary ring assembly within the apparatus 52 is disposed by sandwiching the first O-ring 92 and the second O-ring 96 between outer periphery of stationary ring assembly within the apparatus 52 and inner periphery of the fourth cover member 42, in a radial direction.

Stationary ring assembly within the apparatus 52 comprises stationary ring slide part 56 and adapter part 62. As is shown in the enlarged sectional view of FIG. 2, stationary ring slide part 56 and adapter part 62 are separately formed; and slide part end face at outer side of the apparatus 58, which is an end face of stationary ring slide part 56 at outer side of the apparatus, contacts with adapter part 62. Axial force on adapter part 62 is transmitted to stationary ring slide part 56 via slide part end face at outer side of the apparatus 58. Further, pin 213 for rotary stopper is disposed between stationary ring slide part 56 and adapter part 62. Stationary ring side sliding face 54 is formed on end face of stationary ring slide part 56 at inner side of the apparatus. Further, stationary ring slide part 56 contacts with the first O-ring 92.

Figure 2:
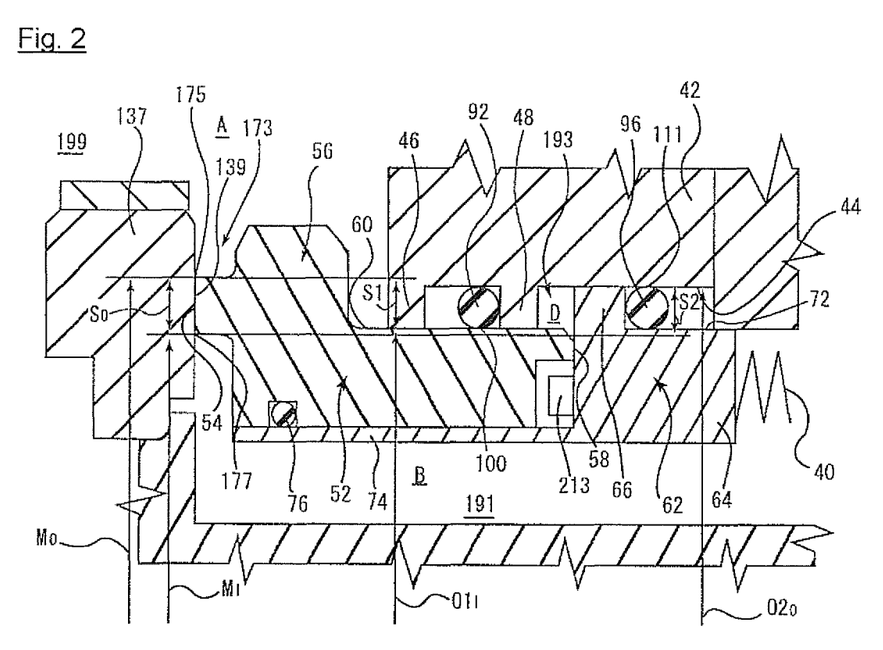
FIG. 2 is an enlarged sectional view, wherein a part peripheral to dynamic seal surface within the apparatus incorporated in the mechanical seal device of FIG. 1 is enlarged.

As is shown in FIG. 1, adapter part 62 comprises thin part 74, thick part 64 and clutch part 65. Among the parts constituting adapter part 62, thick part 64 and clutch part 65 are disposed closer to outside of the apparatus than stationary ring slide part 56. Thin part 74 of adapter part 62, as is shown in FIG. 2, is inserted into inner diameter side of stationary ring slide part 56. O-ring 76 (FIG. 2) is disposed between inner periphery of stationary ring slide part 56 and outer periphery of thin part 74; and seals between stationary ring slide part 56 and thin part 74.

As is shown in FIG. 1, spring within the apparatus 40 is disposed between adapter part 62 and the third cover member 34. Adapter part 62 and the third cover member 34 sandwich both sides of said spring within the apparatus 40. Spring within the apparatus 40 biases entire stationary ring assembly within the apparatus 52, including adapter part 62, toward rotary ring within the apparatus 137 disposed closer to inside of the apparatus than stationary ring assembly within the apparatus 52.

Clutch part 65 is engaged to engagement groove 41, formed on the third cover member 34. Rotation of stationary ring assembly within the apparatus 52 including adapter part 62 with respect to the third cover member 34 of seal cover 22 is stopped by clutch structure comprising clutch part 65 and engagement groove 41.

As is shown in FIG. 2, the first O-ring 92 is sandwiched by the fourth cover member 42 and stationary ring slide part 56 in a radial direction. The first O-ring 92 seals transfer fluid A existing in chamber within the apparatus 199 which is closer to inside of the apparatus than the first O-ring 92. Namely, contact faces of the first O-ring 92 and stationary ring slide part 56 and that of the first O-ring 92 and the fourth cover member 42 in radial direction form transfer fluid secondary seal, which seals transfer fluid A.

End projection 46 and engaging projection on cover side 48 are formed on the fourth cover inner periphery 44, an inner periphery of the fourth cover 42, and are projecting from inner periphery 44 toward inner diameter side. The first O-ring 92 is disposed between end projection 46 and engaging projection on cover side 48. End projection 46 is formed on the end part of the fourth cover inner periphery 44, close to inside of the apparatus. Engaging projection on cover side 48 is formed closer to outside of the apparatus than end projection 46. The first O-ring 92 is sandwiched in between engaging projection on cover side 48 and end projection 46 in axial direction.

The first O-ring 92 receives pressure from transfer fluid A within the apparatus; and that it is pressed to engaging projection on cover side 48 formed closer to outside of the apparatus than the first O-ring 92. Accordingly, engaging projection on cover side 48 locks the first O-ring 92 in axial direction and regulates movement of the first O-ring 92 in axial direction.

While the second O-ring 96 is disposed closer to outside of the apparatus than the first O-ring 92 and is sandwiched between the fourth cover member 42 and adapter part 62 in a radial direction. The second O-ring 96 seals supplying fluid B in fluid supplying chamber 191, which is closer to outside of the apparatus than the second O-ring 96. Namely, contact faces of the second O-ring 96 and adapter part 62 and that of the second O-ring 96 and the fourth cover member 42 in radial direction form supplying fluid secondary seal, which seals supplying fluid B.

Engaging projection on stationary ring side 66 is formed on outer periphery thick part 72, an outer periphery of thick part 64 in adapter part 62; and is projecting from the outer periphery 72 toward outer diameter side. The second O-ring 96 is disposed closer to outside of the apparatus than engaging projection on stationary ring side 66

The second O-ring 96 receives pressure from supplying fluid B existing outside of the apparatus; and that it is pressed to engaging projection on stationary ring side 66 formed closer to inside of the apparatus than the second O-ring 96. Accordingly, engaging projection on stationary ring side 66 locks the second O-ring 96 in axial direction and regulates movement of the second O-ring 96 in axial direction.

As is shown in FIG. 1, low-pressure chamber 193 is formed between outer periphery of stationary ring assembly within the apparatus 52 and inner periphery of the fourth cover member 42, and also between the first O-ring 92 and the second O-ring 96. Low-pressure chamber 193 is sealed from transfer fluid A by transfer fluid secondary seal of the first O-ring 92 and is sealed from supplying fluid B by supplying fluid secondary seal of the second O-ring 96. Low-pressure chamber 193 communicates with outside air via low-pressure introduction flow pass 32 formed in seal cover 22 and low-pressure communication flow pass 38. Accordingly, atmospheric pressure is maintained in low-pressure chamber 193, receiving little pressure from transfer fluid A and supplying fluid B. Note that pressure of low-pressure chamber 193 should only be lower than that of transfer fluid A and supplying fluid B; and that gas and the like, other than outside air, may be introduced into low-pressure chamber 193.

Next, rotary part mounted on rotary shaft 113 will be mentioned. Rotary ring outside the apparatus 159, that slides with stationary ring outside the apparatus 78, and rotary ring within the apparatus 137, that slides with stationary ring assembly within the apparatus 52, are fixed to rotary shaft 113 via sleeve 115, sleeve collar within the apparatus 131, sleeve collar outside the apparatus 151, and the like.

Sleeve 115 comprises insertion bore in order to insert rotary shaft 113; and that rotary shaft 113 inserts in insertion bore of sleeve 115. O-rings 117 and 119 are disposed between inner periphery of sleeve 115 and outer periphery of rotary shaft 113, that seals gap between sleeve 115 and rotary shaft 113.

Sleeve collar outside the apparatus 151 is disposed at the end of sleeve 115 closer to outside of the apparatus, with the use of bolt having hexagonal bore 153. Penetrate bore 151*a* is formed in sleeve collar outside the apparatus 151 in a radial direction; and spiral groove is formed in penetrate bore 151*a*. Set screw 155 is threadably mounted on penetrate bore 151*a* of sleeve collar outside the apparatus 151. Front edge of set screw 155 is engaged to rotary shaft 113; and that set screw 155 fixes sleeve collar outside the apparatus 151 and sleeve 115 connected to sleeve collar outside the apparatus 151 to rotary shaft 113. Note that mechanical seal device 10 is set to rotary shaft 113 mounting set plate 157 which connects sleeve collar outside the apparatus 151 and seal cover 22; however, set plate 157 is dismounted when seal device 10 is used.

Rotary ring outside the apparatus 159 is set closer to inside of the apparatus than sleeve collar outside the apparatus 151 and also at outer diameter side of sleeve 115. Rotary ring outside the apparatus 159 is set to sleeve 115 and sleeve collar outside the apparatus 151 via O-ring 195. Relative rotation of rotary ring outside the apparatus 159, with respect to sleeve collar outside the apparatus 151, is regulated by knock pin 211; and rotary ring outside the apparatus 159 integrally-rotates with rotary shaft 113. Relative rotation of rotary ring outside the apparatus 159 with respect to sleeve collar outside the apparatus 151 is regulated by knock pin 211; and rotary ring outside the apparatus 159 integrally-rotates with rotary shaft 113.

One surface of dynamic seal surface outside the apparatus 171 is formed on the end face of rotary ring outside the apparatus 159 closer to inside of the apparatus. Dynamic seal surface outside the apparatus 171 is constituted from one surface formed on the end face of rotary ring outside the apparatus 159 closer to inside of the apparatus and the other surface formed on the end face of stationary ring outside the apparatus 78 closer to outside of the apparatus. Dynamic seal surface outside the apparatus 171 seals between supplying fluid B and outside air of the third fluid C.

Sleeve collar within the apparatus 131 is disposed to the end of sleeve 115 closer to inside of the apparatus with the use of bolt having hexagonal bore 133.

Rotary ring within the apparatus 137 is set closer to outside of the apparatus than sleeve collar within the apparatus 131 and at outer diameter side of sleeve 115. Further, protective ring 135 is disposed on outer periphery of rotary ring within the apparatus 137 in order to protect rotary ring within the apparatus 137 from damage.

Relative rotation of rotary ring within the apparatus 137 with respect to sleeve collar within the apparatus 131 is regulated by knock pin 214. Therefore, rotary ring within the apparatus 137 integrally-rotates with rotary shaft 113, as is the same with rotary ring outside the apparatus 159.

Rotary ring side sliding face 139 is formed on the end face of rotary ring within the apparatus 137 closer to outside of the apparatus. Rotary ring side sliding face 139 slides with stationary ring side sliding face 54 formed on the end face of stationary ring slide part 56 closer to inside of the apparatus. Rotary ring side sliding face 139 constitutes one face of dynamic seal surface within the apparatus 173, while stationary ring side sliding face 54 constitutes the other face of dynamic seal surface within the apparatus 173.

Dynamic seal surface within the apparatus, which is formed by sliding rotary ring side sliding face 139 and stationary ring side sliding face 54, dynamically seals between transfer fluid A existing closer to inside of the apparatus than dynamic seal surface within the apparatus 173 and supplying fluid B existing closer to outside of the apparatus than dynamic seal surface within the apparatus 173.

As is shown in FIG. 1, fluid supplying chamber 191 is formed between outer periphery of sleeve 115 and inner periphery of seal cover 22. Fluid supplying chamber 191 is sealed from transfer fluid A by dynamic seal surface within the apparatus 173 formed closer to inside of the apparatus than fluid supplying chamber 191. Further, fluid supplying chamber 191 is sealed from the third fluid C by dynamic seal surface outside the apparatus 171 formed closer to outside of the apparatus than fluid supplying chamber 191.

FIG. 2 is an enlarged sectional view, wherein a part peripheral to dynamic seal surface within the apparatus 173 incorporated in mechanical seal device 10 of FIG. 1 is enlarged. Dynamic seal surface within the apparatus 173 is formed by sliding rotary ring side sliding face 139 formed on rotary ring within the apparatus 137 and stationary ring side sliding face 54 formed on stationary ring assembly within the apparatus 52. Dynamic seal surface within the apparatus 173 according to the present embodiment seals between transfer fluid A, existing outer diameter side of dynamic seal surface within the apparatus 173, and supplying fluid B existing inner diameter side of dynamic seal surface within the apparatus 173.

Namely, dynamic seal surface within the apparatus 173 prevents transfer fluid A to enter into fluid supplying chamber 191 from the first seal end 175, which is an end of dynamic seal surface within the apparatus 173 at transfer fluid A side. Further, dynamic seal surface within the apparatus 173 prevents supplying fluid B to enter into chamber within the apparatus 199 from the second seal end 177, which is an end of dynamic seal surface within the apparatus 173 at supplying fluid B side.

Note that, in order to seal between transfer fluid A and supplying fluid B by dynamic seal surface within the apparatus 173, pressing force to press stationary ringside sliding face 54 of stationary ring assembly within the apparatus 52 toward rotary ring side sliding face 139 is required. This is because dynamic seal surface within the apparatus 173 receives force from transfer fluid A and supplying fluid B in a direction to distance stationary ring side sliding face 54 and rotary ring side sliding face 139; and that its resisting force needs to be applied.

According to mechanical seal device 10 of the present embodiment, stationary ring assembly within the apparatus 52, set in such a way to move in axial direction, is able to receive pressing force toward rotary ring within the apparatus 137 not only from spring within the apparatus 40 but also from transfer fluid A and supplying fluid B.

For instance, stationary ring assembly within the apparatus 52 is ale to receive pressing force from transfer fluid A, which corresponds to pressure from transfer fluid A. Transfer fluid A is secondarily sealed by the first O-ring 92. Accordingly, inner periphery of the first fluid secondary seal 100, formed by contacting face of the first O-ring 92 and stationary ring slide part 56 in a radial direction, forms a boundary of transfer fluid A existing region and transfer fluid A not existing region. Note that when a formation formed by a boundary of "pressure acting region" and "pressure not acting region" is defined as "the first pressure acting diameter", "the first pressure acting diameter" of the present embodiment corresponds to inner periphery of the first fluid secondary seal 100. Here, "pressure acting region" is where transfer fluid A presses stationary ring assembly within the apparatus 52 except stationary ringside sliding face 54, whereas "pressure not acting region" is where transfer fluid A does not press stationary ring assembly within the apparatus 52.

Here, inner periphery of the first fluid secondary seal 100, as is shown in FIG. 2, is located closer to inner diameter side than the first seal end 175 of dynamic seal surface within the apparatus 173, which is at the second seal end 177 side, when seen in radial direction. When inner periphery of the first fluid secondary seal 100, which is the first pressure acting diameter, is located closer to inner diameter side than the first seal end 175, surface area, which receives pressure from transfer fluid A, of stationary ring assembly within the apparatus 52 located inside of the apparatus and that of stationary ring assembly within the apparatus 52 located outside of the apparatus become unbalance, and said surface area located outside of the apparatus becomes large. This enables stationary ring assembly within the apparatus 52 to receive pressing force toward rotary ring within the apparatus 137 from transfer fluid A.

In this way, stationary ring assembly within the apparatus 52 is ale to receive pressing force from transfer fluid A, which corresponds to pressure from transfer fluid A. Namely, when pressure from transfer fluid A is high, stationary ring assembly within the apparatus 52 receives high pressing force; while when pressure from transfer fluid A is low, it receives lower pressing force.

Here, balance value $BV_A$, which shows balance of pressing force from transfer fluid A, is expressed by the following mathematical formula 1 by using $M_O$, a diameter of the first seal end 175, $M_I$, a diameter of the second seal end 177, and $OI_F$, a diameter of inner periphery of the first fluid secondary seal 100, which is the first pressure acting diameter.

$$BV_A = S1/S0 \times 100 \qquad \text{(mathematical formula 1)}$$

Note: $S1 = \pi(M_O^2 - OI_F^2)/4$
$S0 = \pi(M_O^2 - M_I^2)/4$

Balance value $BV_A$ is suitably set according to conditions in which mechanical seal device 10 is used; and for a mechanical seal device used as a shaft seal device of a pump conveying high viscosity fluid, it may preferably be 70 to 130%.

Further, stationary ring assembly within the apparatus 52 is ale to receive pressing force from supplying fluid B, which corresponds to pressure from supplying fluid B. Supplying fluid B is secondarily sealed by the second O-ring 96. Accordingly, outer periphery of the second fluid secondary seal 111, formed by contacting face of the second O-ring 96 and the fourth cover member 42 in a radial direction, forms a boundary of supplying fluid B existing region and supplying fluid B not existing region. Further, since the second O-ring 96 is locked to engaging projection on stationary ring side 66, force in axial direction from supplying fluid B to the second O-ring 96 is transmitted to adapter part 62. Note that when a formation, formed by a boundary of "pressure acting region" and "pressure not acting region", is defined as "the second pressure acting diameter", "the second pressure acting diameter" of the present embodiment corresponds to outer periphery of the second fluid secondary seal 111. Here, "pressure acting region" is where supplying fluid B presses stationary ring assembly within the apparatus 52 except stationary ring side sliding face 54, whereas "pressure not acting region" is where supplying fluid B does not press stationary ring assembly within the apparatus 52.

Here, outer periphery of the second fluid secondary seal 111, as is shown in FIG. 2, is located closer to outer diameter side than the second seal end 177 of dynamic seal surface within the apparatus 173, which is at the first seal end 175 side, when seen in radial direction. When outer periphery of the second fluid secondary seal 111, which is the second pressure acting diameter, is located closer to outer diameter side than the second seal end 177, surface area, which receives pressure from supplying fluid B, of stationary ring assembly within the apparatus 52 located inside of the apparatus and that of stationary ring assembly within the apparatus 52 located outside of the apparatus become unbalance, and said surface area located outside of the apparatus becomes large. This enables stationary ring assembly within the apparatus 52 to receive pressing force toward rotary ring within the apparatus 137 from supplying fluid B.

In this way, stationary ring assembly within the apparatus 52 is ale to receive pressing force not only from transfer fluid A but also from supplying fluid B, which corresponds to pressure from supplying fluid B. Further, stationary ring assembly within the apparatus 52 is able to receive pressing force toward rotary ring within the apparatus 137 from both transfer fluid A and supplying fluid B, accordingly, suitable pressing force can be obtained even when under positive pressure, wherein pressure from transfer fluid A is higher than that of supplying fluid B, or when under counter pressure, wherein pressure from supplying fluid B is higher than that of transfer fluid A. Therefore, mechanical seal device 10 of the present embodiment is capable to suitably seal between transfer fluid A and supplying fluid B even when pressure from transfer fluid A periodically-varies and pressure conditions of transfer fluid A and supplying fluid B frequently switches between a positive pressure and a counter pressure.

Here, balance value $BV_B$, which shows balance of pressing force from supplying fluid B, is expressed by the following mathematical formula 2 by using $M_O$, a diameter of the first seal end 175, $M_I$, a diameter of the second seal end 177, and $O2_O$, a diameter of outer periphery of the second fluid secondary seal 111, which is the second pressure acting diameter.

$$BV_B = S2/S0 \times 100 \quad \text{(mathematical formula 2)}$$

Note: $S2 = \pi(O2_O{}^2 - M_I{}^2)/4$
$S0 = \pi(M_O{}^2 - M_I{}^2)/4$

Balance value $BV_B$, as is the same with $BV_A$, is suitably set according to conditions in which mechanical seal device 10 is used.

Further, it is preferable that balance value $BV_B$, which shows balance of pressing force from supplying fluid B, is approximately the same with the balance value $BV_A$, which shows balance of pressing force from transfer fluid A. If balance values of $BV_A$ and $BV_B$ are approximately the same, stationary ring assembly within the apparatus 52 is able to receive a stable pressing force even when pressure conditions of transfer fluid A and supplying fluid B frequently switches between a positive pressure and a counter pressure.

When making balance values of $BV_A$ and $BV_B$ approximately the same, formations of the first O-ring 92 and the second O-ring 96 can be approximately the same by locking the first O-ring 92 with engaging projection on cover side 48 and locking the second O-ring 96 with engaging projection on stationary ring side 66. Therefore, mechanical seal device 10 having such structure is able to make the first O-ring 92 and the second O-ring 96 common part, and that types of component parts can be decreased making their assemble easy. Further, by locking the first O-ring 92 with the fourth cover member 42 and locking the second O-ring 96 with stationary ring assembly within the apparatus 52, formations of low-pressure chamber 193 and the fourth cover member 42 can be simplified.

Engaging projection on cover side 48 doubles as a stopper, which prevents adapter part 62 to fall out in axial direction. Therefore, mechanical seal device 10 is able to prevent adapter part 62 to fall out when assemble and disassemble, which makes the assemble and disassemble easy.

Note that in mechanical seal device 10 of the present embodiment, diameter of outer periphery of slide part 60 contacting inner periphery of the first O-ring 92 and that of outer periphery thick part 72 contacting inner periphery of the second O-ring 96 are made approximately the same. Further, diameter of the fourth cover inner periphery 44, which is inner periphery of the fourth cover member 42, contacting outer periphery of the first O-ring 92 and that of the fourth cover inner periphery 44 contacting outer periphery of the second O-ring 96 are made approximately the same.

As is shown in FIG. 2, low-pressure chamber 193 is formed between the first O-ring 92 and the second O-ring 96. Low-pressure chamber 193 communicates with outside air; therefore, pressure in said chamber 193 is kept lower than that of transfer fluid A, comprising liquid and the like conveyed by pump, and that of supplying fluid B, comprising liquid and the like supplied and ejected to fluid supplying chamber 191.

The first O-ring 92A seals between transfer fluid A and low-pressure fluid D; therefore, the first O-ring 92A is pressed to engaging projection on cover side 48, which is located low-pressure chamber 193 side of the first O-ring 92A, by pressure difference of transfer fluid A and low-pressure fluid D. The second O-ring 96 seals between supplying fluid B and low-pressure fluid D; therefore, the second O-ring 96 is pressed to engaging projection on stationary ring side 66, which is located low-pressure chamber 193 side of the second O-ring 96, by pressure difference of supplying fluid B and low-pressure fluid D.

Even when pressure from transfer fluid A varies, or even when pressure conditions of transfer fluid A and supplying fluid B are frequently switched between a positive pressure and a counter pressure, the pressure in low-pressure chamber 193, which communicates with outside air, is kept sufficiently lower than those of transfer fluid A and supplying fluid B. Accordingly, even when pressure from transfer fluid A varies, or even when pressure conditions of transfer fluid A and supplying fluid B are frequently switched between a positive pressure and a counter pressure, the first O-ring 92 and the second O-ring 96 are maintained to be respectively pressed to projections 48 and 66 at low-pressure chamber 193 side.

As described, mechanical seal device 10 is capable of preventing the first O-ring 92 and the second O-ring 96, the secondary seals of transfer fluid A and supplying fluid B, to move according to pressure change of transfer fluid A and the like. Further, mechanical seal device 10 of the present embodiment prevents wear phenomena of the first O-ring 92 and the second O-ring 96 themselves and also that of the fourth cover member 42 and stationary ring assembly within the apparatus 52 those contact with the first O-ring 92 and the second O-ring 96; which leads to high-durability of the device 10.

In mechanical seal device 10 of the present embodiment, stationary ring slide part 56 and adapter part 62 are made separate; therefore, formation of the fourth cover member 42 is simple. However, stationary ring assembly within the apparatus 52 may be one unit wherein stationary ring slide part 56 and adapter part 62 are integrally formed. For instance, when stationary ring assembly within the apparatus 52 is one unit, the fourth cover member 42 may be, but is not limited to, a parted type which is parted by a cross-section along rotary shaft.

Note that stationary ring slide part 56 and rotary ring within the apparatus 137 of mechanical seal device 10 are respectively made of materials such as silicon carbide (SiC), carbon and cemented carbide. And for materials of the first O-ring 92 and the second O-ring 96 of mechanical seal device 10, fluorine-containing rubber, nitrile rubber, EPDM, perfluoroelastomer and the like are used.

The Second Embodiment

Figure 3:
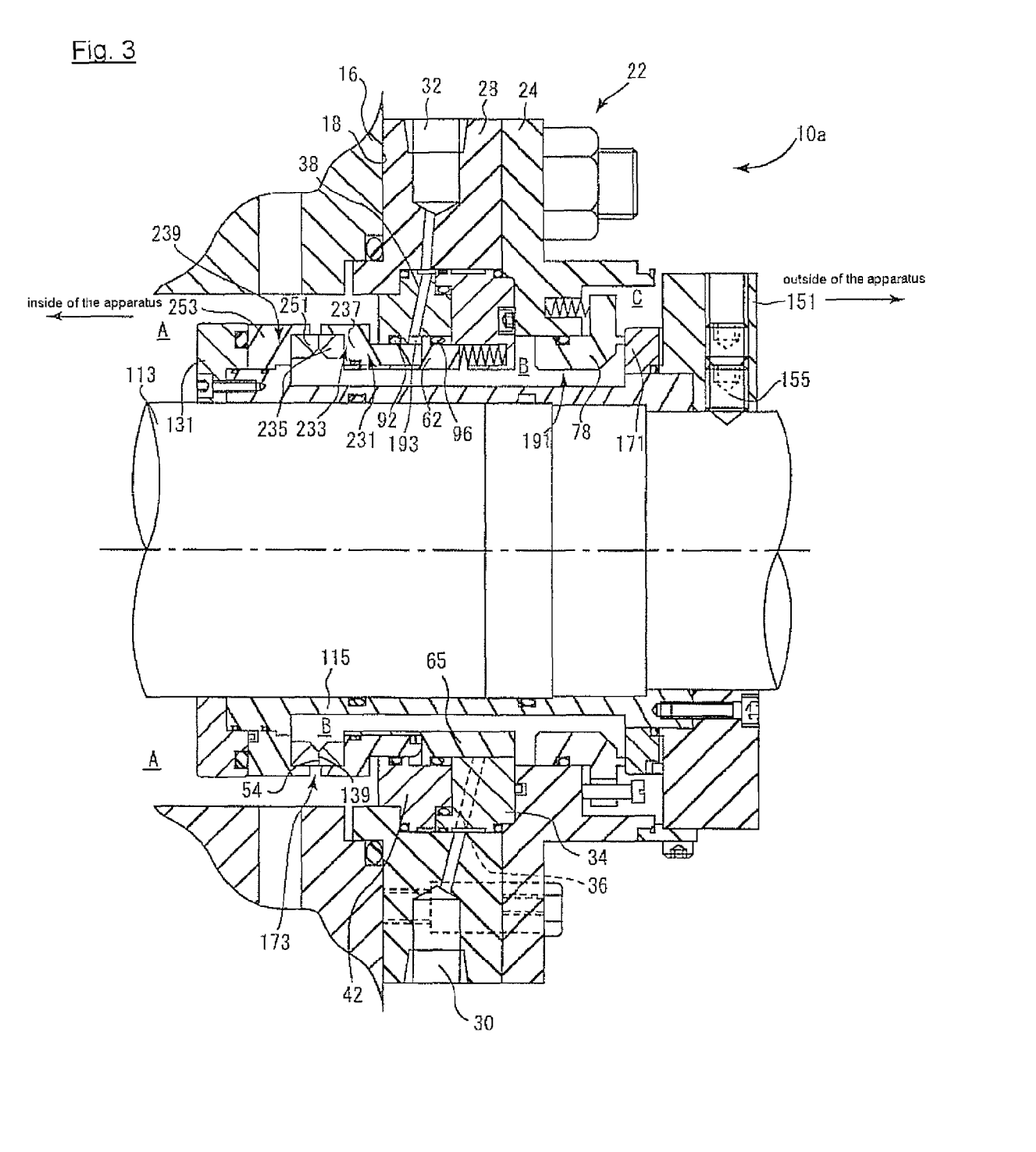
FIG. 3 is a longitudinal cross sectional view of a mechanical seal device as a second embodiment of the present invention.

FIG. 3 shows a longitudinal sectional view of mechanical seal device 10a according to the second embodiment of the present invention. Mechanical seal device 10a of the second embodiment is the same with mechanical seal device 10 of the first embodiment, except stationary ring assembly within the apparatus 231 and rotary ring within the apparatus 239 both comprise separately formed retainer and slide ring. For the components in mechanical seal device 10a in FIG. 3, which are the same with that of mechanical seal device 10 of the first embodiment, the same reference numerals are given and their explanations are saved.

Stationary ring assembly within the apparatus 231 of mechanical seal device 10a, as is the same with stationary ring assembly within the apparatus 52 according to the first embodiment, comprises stationary ring slide part 233 and adapter part 62. Stationary ring slide part 233 comprises separately formed stationary slide ring 235 and retainer at stationary side 237. Stationary ring side sliding face 54 is formed on the end of stationary slide ring 235 closer to inside of the apparatus, which slides with rotary ring side sliding face 139, constituting one face of dynamic seal surface within the apparatus 173, and constitutes the other face of dynamic seal surface within the apparatus 173. Retainer at stationary side 237 contacts with the first O-ring 92. Stationary slide ring 235 is fixed to retainer at stationary side 237 by thermal insert.

Rotary ring within the apparatus 239 of mechanical seal device 10a comprises separately formed stationary slide ring 235 and retainer at stationary side 237. Rotary ring side sliding face 139, constituting one face of dynamic seal surface within the apparatus 173, is formed on the end of rotary slide ring 251 closer to inside of the apparatus. Rotary slide ring 251, as is the same with stationary slide ring 235, is fixed to retainer at rotary side 251 by thermal insert.

In mechanical seal device 10a, since slide ring 235, 251 and retainer 237, 253 is separately formed, slide ring 235, 251, on which stationary ring side sliding face 54 or rotary ring side sliding face 139 is formed, can be miniaturized and that crack initiation on slide ring 235, 251 can be prevented. Further, by miniaturizing slide ring 235, 251 and simplifying forms of slide ring 235, 251, manufacturing cost of mechanical seal device 10a can be held down. Furthermore, by fixing slide ring 235, 251 to retainer 237, 253 by thermal insert, slide ring 235, 251 is partially guarded by retainer 237, 253; and that slide ring 235, 251 is prevented from damage when such as assemble or disassemble. Mechanical seal device 10a of the second embodiment produces the same effect as that of mechanical seal device 10 of the first embodiment.

The Third Embodiment

Figure 4:
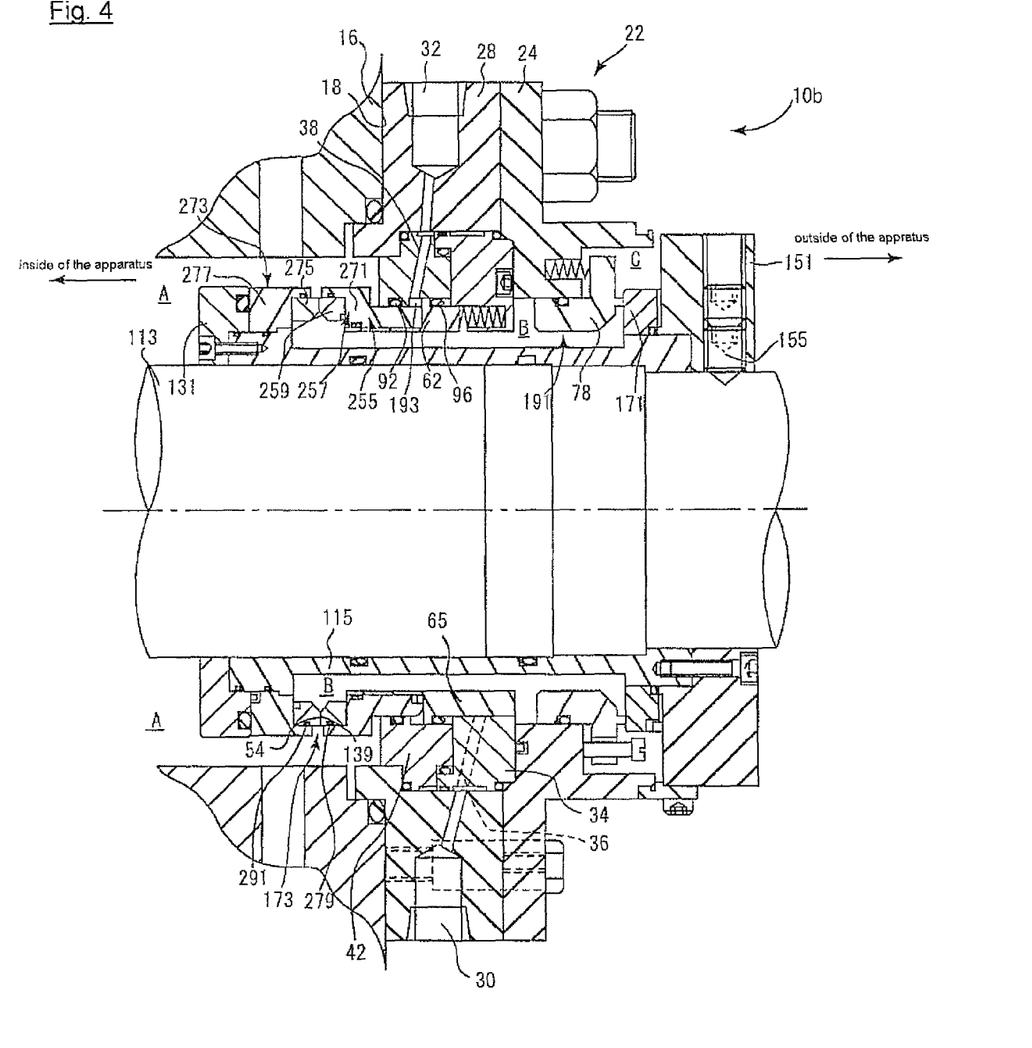
FIG. 4 is a longitudinal cross sectional view of a mechanical seal device as a third embodiment of the present invention.

FIG. 4 is a longitudinal cross sectional view of a mechanical seal device 10b as the third embodiment of the present invention. Mechanical seal device 10b of the third embodiment is the same with mechanical seal device 10a of the second embodiment, except stationary slide ring 259 is fixed to retainer at stationary side 271 via the third O-ring 279 and rotary slide ring 275 is fixed to retainer at rotary side 277 via the fourth O-ring 291. For the components in mechanical seal device 10b in FIG. 4, which are the same with that of mechanical seal device 10 of the first embodiment or that of mechanical seal device 10a of the second embodiment, the same reference numerals are given and their explanations are saved.

Stationary ring assembly within the apparatus 255 of mechanical seal device 10b, as is the same with stationary ring assembly within the apparatus 52 according to the first embodiment, comprises stationary ring slide part 257 and adapter part 62. Stationary ring slide part 257, as is the same with the second embodiment, comprises separately formed stationary slide ring 259 and retainer at stationary side 271. Stationary slide ring 259 is fixed to retainer at stationary side 271 by O-ring mount via the third O-ring 279.

Rotary ring within the apparatus 273 of mechanical seal device 10b, as is the same with rotary ring within the apparatus 239 (FIG. 3) of the second embodiment, comprises rotary slide ring 275 and retainer at rotary side 277. Stationary slide ring 275 is fixed to retainer at rotary side 277 by O-ring mount via the fourth O-ring 291.

In mechanical seal device 10b, since slide ring 259, 275 and retainer 271, 277 are separately formed, slide ring 259, 275, on which stationary ring side sliding face 54 or rotary ring side sliding face 139 is formed, can be miniaturized and that crack initiation on slide ring 259, 275 can be prevented. Further, by miniaturizing slide ring 259, 275 and simplifying forms of slide ring 259, 275, manufacturing cost of mechanical seal device 10b can be held down. Furthermore, in mechanical seal 10b, slide ring 259, 275 is fixed to retainer 271, 277 via O-ring mount. Accordingly, in mechanical seal device 10b, it is capable to replace only slide ring 259, 275; and that cost for replacement components can be held down. Note that mechanical seal device 10b of the third embodiment produces the same effect as that of mechanical seal device 10 of the first embodiment.

Note that stationary slide rings 235 and 259 and rotary slide rings 251 and 275 of mechanical seal devices 10a and 10b are respectively made of materials such as silicon carbide (SiC), carbon and cemented carbide. In this case, retainer at stationary side 237 and 271 and retainer at rotary side 253 and 277 can be manufactured from metals such as SUS. And for materials of the third O-ring 279 and the fourth O-ring 291 of mechanical seal device 10b, fluorine-containing rubber, nitrile rubber, EPDM, perfluoroelastomer and the like are used.

Note that the embodiments described hereinbefore are to facilitate understanding of the invention, and that they do not limit the invention in any way. Each component described in the embodiments includes all the design variations and equivalents within the scope of the invention, and that arbitrarily preferred various changes may be made.

What is claimed is:

1. A mechanical seal device comprising:

a rotary ring provided on a rotary shaft so as to integrally rotate with the rotary shaft, and on which a rotary ring side sliding face that constitutes one face of dynamic seal surfaces, which dynamically seals between a first fluid within the apparatus and a second fluid provided closer to an outside of the apparatus than the first fluid, is formed;

a stationary ring assembly on which a stationary ring side sliding face that slides with the rotary ring side sliding face and constitutes an other surface of the dynamic seal surface is formed;

a seal cover which contains the stationary ring assembly on an inner diameter side and supports the stationary ring assembly to move freely in an axial direction of the rotary shaft;

a first O-ring which is sandwiched by the seal cover and the stationary ring assembly in a radial direction of the rotary shaft to seal the first fluid, and;

a second O-ring which is provided closer to the outside of the apparatus than the first O-ring, and which is sandwiched by the seal cover and the stationary ring assembly in the radial direction, to seal the second fluid; wherein:

a low-pressure chamber, which is sealed from the first fluid and the second fluid by the first O-ring and the second O-ring and which maintains continual pressure lower than the pressure of the first fluid and that of the second fluid, is formed between the first O-ring and the second O-ring;

a first pressure acting diameter, formed by a boundary of a pressure acting region, in which the first fluid presses the stationary ring assembly except the stationary ring side sliding face, and a pressure not acting region, in which the first fluid does not press the stationary ring assembly, is located, when viewed in the radial direction, on a second seal end side which is an end of the dynamic seal surfaces at the second fluid side with respect to a first seal end which is an end of the dynamic seal surfaces at the first fluid side; and a second pressure acting diameter, formed by a boundary of a pressure acting region, in which the second fluid presses the stationary ring assembly except the stationary ring side sliding face, and a pressure not acting region, in which the second fluid does not press the stationary ring assembly, is located, when viewed in the radial direction, on the first seal end side with respect to the second seal end.

2. The mechanical seal device as set forth in claim 1 wherein:

the seal cover comprises an engaging projection on a cover side, which locks the first O-ring in the axial direction and regulates movement of the first O-ring in the axial direction;

the stationary ring assembly comprises an engaging projection on a stationary ring side which locks the second O-ring in the axial direction and regulates movement of the second O-ring in the axial direction;

the first pressure acting diameter corresponds to an inner periphery of a first fluid secondary seal, formed by a contact face in the radial direction between the first O-ring and the stationary ring assembly, and a diameter of the inner periphery of the first fluid secondary seal is smaller than that of the first seal end; and the second pressure acting diameter corresponds to an outer periphery of a second fluid secondary seal, formed by a contact face in the radial direction between the second O-ring and the seal cover, and a diameter of the outer periphery of the second fluid secondary seal is larger than that of the second seal end.

3. The mechanical seal device as set forth in claim 1 wherein:

the stationary ring assembly comprises a stationary ring slide part, on which the stationary ring side sliding face is formed, and contacts the first O-ring, and an adapter part which is at least partially disposed closer to the outside of the device than the stationary ring slide part, and contacts the second O-ring; and the stationary ring slide part and the adapter part are formed separately, and a slide part end face at an outer side of the apparatus, which is an end face of the stationary ring slide part closer to the outside of the apparatus, contacts the adapter part.

4. The mechanical seal device as set forth in claim 3 wherein the engaging projection on the cover side doubles as a stopper, which prevents the adapter from falling out in the axial direction.

5. The mechanical seal device as set forth in claim 3 wherein the stationary ring slide part comprises a slide ring on which the stationary ring side sliding face is formed and a retainer which contacts with the first O-ring, and wherein the slide ring and the retainer are separately formed and the slide ring is fixed to the retainer.

6. The mechanical seal device as set forth in claim 5 wherein the slide ring is fixed to the retainer by a shrink fit.

7. The mechanical seal device as set forth in claim 5 wherein the slide ring is fixed to the retainer via a third O-ring.

8. The mechanical seal device as set forth in claim 1 wherein the seal cover is provided with a communication pass penetrating to the low-pressure chamber and the communication pass has an opening on the outer periphery of the seal cover.

* * * * *